Feb. 17. 1925.  
E. O. COX  
1,527,122  
HUB AND SPOKE CONNECTION  
Filed April 17, 1922
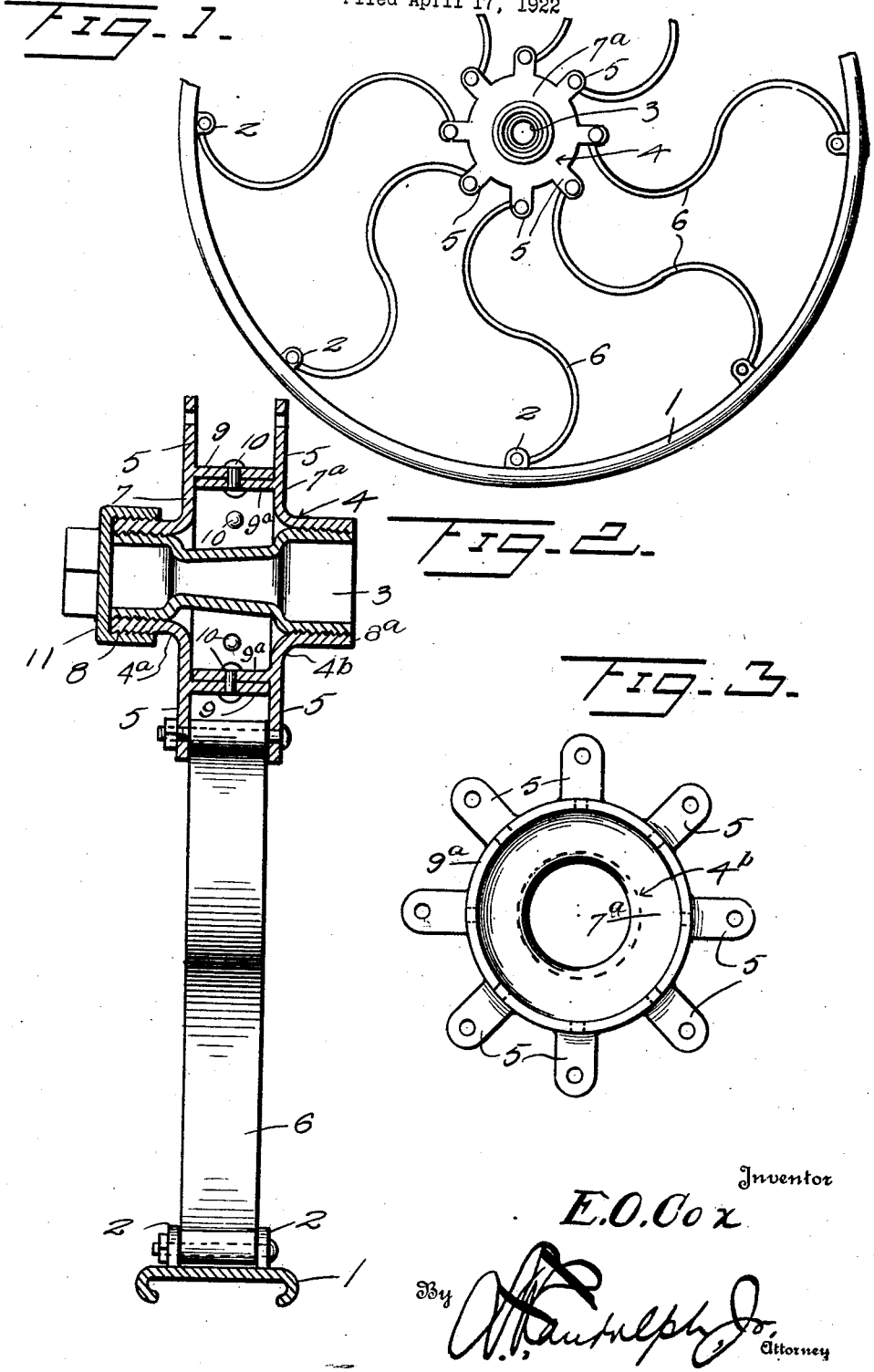

Patented Feb. 17, 1925.

1,527,122

UNITED STATES PATENT OFFICE.

ERNEST O. COX, OF ANNAPOLIS, MARYLAND.

HUB AND SPOKE CONNECTION.

Application filed April 17, 1922. Serial No. 553,746.

*To all whom it may concern:*

Be it known that I, ERNEST O. COX, a citizen of the United States, residing at Annapolis, in the county of Anne Arundel and State of Maryland, have invented certain new and useful Improvements in Hub and Spoke Connections; and I do hereby declare the following to be a full, clear, and exact description of the invention, such as will enable others skilled in the art to which it appertains to make and use the same.

This invention relates to vehicle wheels and more particularly to a wheel of the type including spring spokes which operate to neutralize and absorb shock and vibration whereby it is possible to utilize a solid tire and thereby obviate the annoyance incident to pneumatic tires generally provided for automobiles and motor vehicles.

The invention consists of a wheel embodying a rim, a hub and spring spokes, the latter having portions reversely curved to admit of the wheel yielding so as to compensate for shock and vibration.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a part of a spring wheel embodying the invention.

Figure 2 is a sectional detail view in an axial plane of the wheel, showing the hub and one spoke, and Figure 3 is a side elevation of the inner hub portion.

Corresponding and like parts are referred to in the following description and designated in the several views of the drawings by like reference characters.

The wheel embodies a rim 1 which may be of any construction depending upon the nature of the tire to be fitted thereto. Ears or lugs 2 project inwardly from the rim 1 at regular intervals and may be provided in any manner, either as a part of the rim or secured thereto in any preferred way as by being welded or brazed thereto.

The hub comprises a box 3 and a shell 4 screwed or otherwise fastened to the box and having outer extensions 5 to receive the inner ends of the spokes which are fastened thereto in any manner. The box 3 may be cast and the shell 4 of sheet metal such as steel.

The spring spokes 6 have portions reversely curved and are attached at their outer ends to the lugs 2 of the rim and at their inner ends to the extensions 5 of the hub. The spokes may be attached to the respective parts in any preferred way to admit of their ready replacement should occasion require.

The shell 4 comprises mating sections $4^a$ and $4^b$. The section $4^a$ has an annular plate or ring 7 and section $4^b$ a corresponding plate or ring $7^a$. 8 is an externally and internally threaded annular boss extending at one side of the plate or ring 7 and 9 a lateral annular flange extending from the other side thereof. Ring $7^a$ has an internally threaded boss $8^a$ extending therefrom and a lateral annular flange $9^a$ extending from its other side, said flange $9^a$ being of a reduced diameter to fit snugly within flange 9. 10 are rivets to hold the flanges 9 and $9^a$ together when the hub is assembled as shown in Figure 2. A cup-shaped nut 11 is provided to fit the external threads of boss 8.

What is claimed is:

A wheel hub having a plurality of hub sections, each section being in a single piece and having an outwardly extending boss, the interior diameter of one of the bosses being greater than that of the other boss, each section having an annular inwardly extending flange arranged outwardly of its boss, said flanges being in telescopic relation, means at and securing said flanges together against lateral separation and circumferential movement, a box spanning said plates and surrounded by said flanges, said box extending into said bosses and being screw threaded to each of them to afford a connection between the box and each section, each section having portions extending outwardly beyond said flanges with their inner surfaces arranged in parallelism, and said portions having openings therethrough to facilitate attachment of spokes to and between the sections.

In testimony whereof I affix my signature in presence of two witnesses.

ERNEST O. COX.

Witnesses:
CHARLES O. DULIN,
FRANK W. THOMPSON, Jr.